(12) United States Patent
Hom et al.

(10) Patent No.: US 8,359,328 B2
(45) Date of Patent: Jan. 22, 2013

(54) PARTY REPUTATION AGGREGATION SYSTEM AND METHOD

(75) Inventors: Richard V. Hom, Troy, MI (US); David C. Roxin, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 12/815,431

(22) Filed: Jun. 15, 2010

(65) Prior Publication Data

US 2011/0307474 A1  Dec. 15, 2011

(51) Int. Cl.
*G06F 17/30* (2006.01)
(52) U.S. Cl. ........ 707/769; 707/722; 707/732; 707/731; 709/203; 709/229; 709/206; 705/319
(58) Field of Classification Search ............... 707/722, 707/732, 769, 731; 709/203, 229, 206; 705/319, 705/7, 27
See application file for complete search history.

(56) References Cited

U.S. PATENT DOCUMENTS

| | | | |
|---|---|---|---|
| 6,615,253 B1 | 9/2003 | Bowman-Amuah | |
| 6,766,314 B2 | 7/2004 | Burnett | |
| 7,552,110 B2 | 6/2009 | Hrle et al. | |
| 7,568,097 B2 | 7/2009 | Burnett | |
| 7,698,255 B2 | 4/2010 | Goodwin et al. | |
| 7,698,303 B2 | 4/2010 | Goodwin et al. | |
| 7,870,203 B2 * | 1/2011 | Judge et al. | 709/206 |
| 7,937,480 B2 * | 5/2011 | Alperovitch et al. | 709/229 |
| 8,010,460 B2 * | 8/2011 | Work et al. | 705/319 |
| 8,027,975 B2 * | 9/2011 | Gabriel et al. | 707/731 |
| 8,214,497 B2 * | 7/2012 | Alperovitch et al. | 709/226 |
| 2002/0147706 A1 | 10/2002 | Burnett | |
| 2005/0005079 A1 | 1/2005 | Boudou et al. | |
| 2007/0006326 A1 | 1/2007 | Redlich et al. | |
| 2007/0101436 A1 | 5/2007 | Redlich et al. | |
| 2007/0255753 A1 * | 11/2007 | Pomerantz | 707/104.1 |
| 2008/0005223 A1 * | 1/2008 | Flake et al. | 709/203 |
| 2008/0175266 A1 * | 7/2008 | Alperovitch et al. | 370/465 |
| 2008/0281807 A1 * | 11/2008 | Bartlang et al. | 707/5 |
| 2009/0024489 A1 * | 1/2009 | Baldua et al. | 705/27 |
| 2009/0024574 A1 | 1/2009 | Timmons | |
| 2009/0187442 A1 * | 7/2009 | Kohanim et al. | 705/7 |
| 2009/0265551 A1 | 10/2009 | Tripunitara et al. | |
| 2011/0202551 A1 * | 8/2011 | Agrawal | 707/769 |
| 2012/0036127 A1 * | 2/2012 | Work et al. | 707/732 |
| 2012/0124033 A1 * | 5/2012 | Gabriel et al. | 707/722 |

OTHER PUBLICATIONS

Pujol, J. M. et al., "Extracting Reputation in Multi Agent Systems by Means of Social Network Topology", Proceedings of the First International Joint Conference on Autonomous Agents and Multiagent Systems, Jul. 15-19, 2002, Bologna, Italy. Publisher: ACM Press, pp. 467-474.

* cited by examiner

*Primary Examiner* — Frantz Coby
(74) *Attorney, Agent, or Firm* — John R. Pivnichny; Ronald A. D'Alessandro; Keohane & D'Alessandro PLLC

(57) ABSTRACT

A party reputation aggregation unit determines and collects the reputation of a party from various sources. Further, the party reputation aggregation unit provides for the weighing and aggregation of such data, including reputation data of the party, reputation data of the party's relationships, reputation data of the party's social networks and reputation data of the members of the party's social network so that a complete picture of an individual or organization may be provided to a qualified requestor for his/her use/assessment.

25 Claims, 10 Drawing Sheets

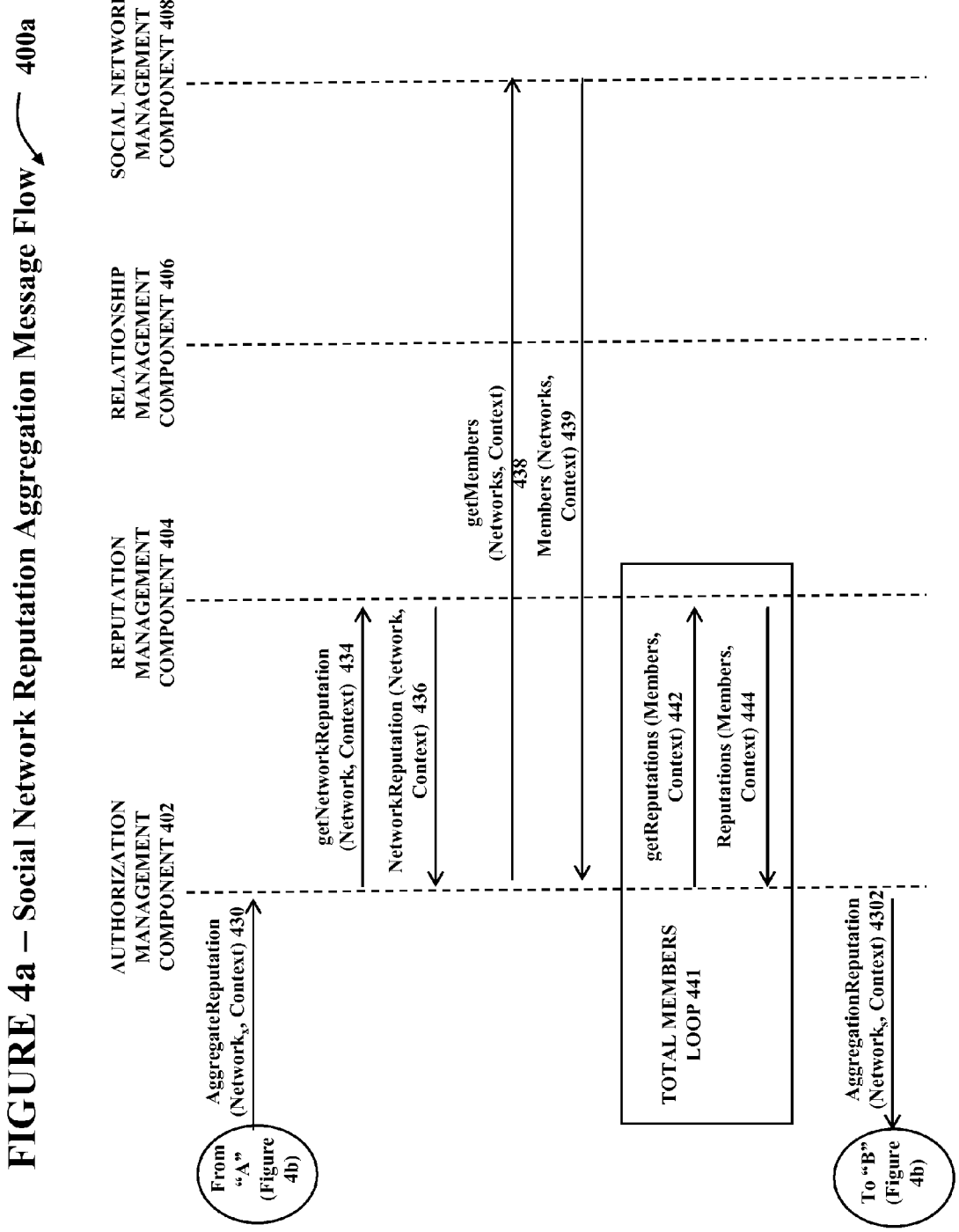
FIGURE 4a – Social Network Reputation Aggregation Message Flow 400a

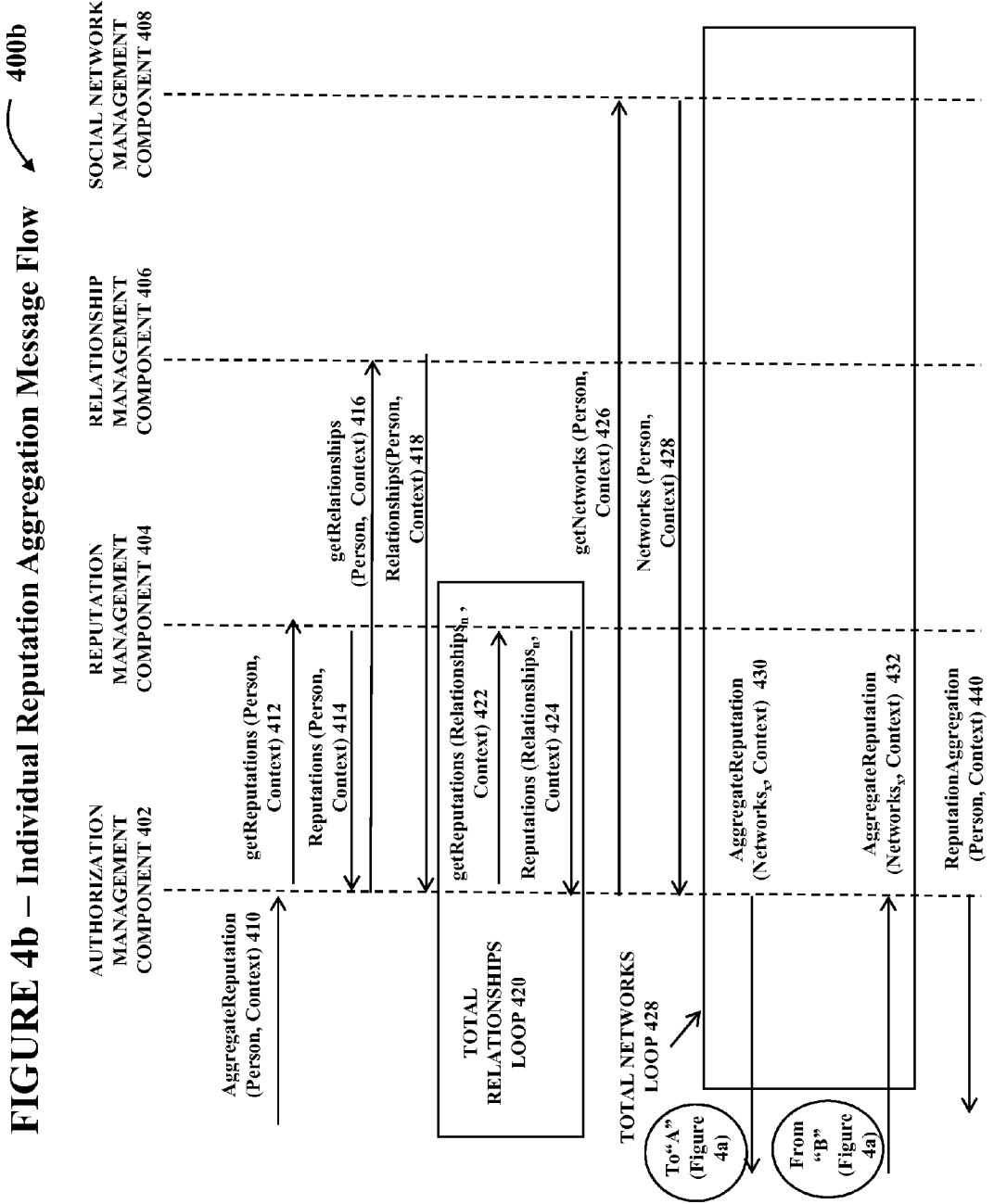
FIGURE 4b – Individual Reputation Aggregation Message Flow

PARTY REPUTATION AGGREGATION SYSTEM AND METHOD

RELATED APPLICATIONS

The following application, commonly-owned with this one, filed on May 6, 2010, having U.S. patent application Ser. No. 12/775,410, entitled "Reputation Based Access Control", is hereby incorporated by reference in its entirety for all purposes.

FIELD OF THE INVENTION

Aspects of the present invention provide for a method and a system for determining, collecting and aggregating the reputation of a party from various sources.

BACKGROUND OF THE INVENTION

Many times, there is a need to assess the reputation, qualities or attributes of an individual or an organization such as a social networking organization. Some examples of times where it is desirable to assess an individual's or an organization's reputation, qualities or attributes may be when an individual or an organization is requesting physical access (e.g., to a building or a secured area within a building, to use a bulldozer or other power equipment, etc.) or electronic access (e.g., to a secured database or application on a server). For instance, it may be useful to understand the individual's skill level at a particular task, such as the individual's skill at operating a dangerous power tool or the individual's skill at programming in Java® programming language. Relevant information may include certifications received by the individual, peer reviews of the individual by his peers, an expert opinion of the individual's skill at that task, security level, the individual's activity history (e.g., as to whether the individual performed well in the past in a particular task), the individual's associations with organizations (e.g., programmers' user groups, social groups, social networking organizations, etc.) and individual's relationships with other individuals (e.g., father-son, attorney-client, friend-friend, etc.).

However, presently, this type of information may be dispersed across many different, possibly unconnected information stores. It is possible that present data systems, including such directory services as Lightweight Directory Access Protocol (LDAP)—like directory services, e.g., Microsoft® LDAP software or Microsoft Active Directory® software, do not maintain a history for an individual or an organization. Further, it may be that no history on artifacts is kept in many content management systems (CMSs) that integrate/interface with LDAP-like directory services. Further yet, there may be no mechanism for tracking an individual's or organization's pedigree/reputation/reliability/trustworthiness factors or one that has history for the same.

There is a problem in that there is a gap in maintaining an individual's or organization's history with respect to an enterprise's security model. In the case of an enterprise, individuals may enter and leave the enterprise over time. As such, security may be granted on a temporal basis only such that there may be a lack of historical recording that tells of an individual's security life cycle in the enterprise. Moreover, this gap may leave the individual's social network absent from the individual's security life cycle model at each interval that they are active in the enterprise. This may be important because, when an individual is determined to be "unreliable" for any reason, it may prove valuable to trace through any and all relationships that point to the source at any time, past and/or present, for finding "human security holes."

What are needed are a system and method for creating, maintaining and monitoring of individuals, organizations and artifacts relating to the same over time with respect to pedigree and reputation, security and reliability. Further, a system and method are needed to collect, weigh and aggregate such maintained history, including associations and affiliations between each where applicable.

Therefore, there exists a need for a solution that solves at least one of the deficiencies of the related art.

SUMMARY OF THE INVENTION

The present invention provides a method and system for determining and collecting the reputation of a party from various sources. Further, the method and system provide for the aggregation of such data so that a complete picture of an individual or organization may be provided to a qualified requestor for his/her use/assessment.

The present invention may further comprise a method in a data processing system having a network I/O, a CPU, and one or more databases, a party aggregation query unit and a party reputation aggregation unit coupled to the party aggregation query unit, the data processing system further having stored reputation data of one or more parties therein, the method for retrieving and aggregating the stored reputation data of a requested party within a specified context having steps such as receiving a reputation aggregation request having a party parameter and a context parameter requesting a response having aggregated party reputation data for a requested party within a context, the party parameter specifying the requested party and the context specifying the context for which the aggregated party reputation data is requested, retrieving the stored reputation data related to the requested party within the specified context, determining if the requested party is a person and, if so, retrieving stored relationship data relating to the requested person, retrieving the stored reputation data within the specified context for each relationship relating to the requested person, retrieving the stored network data relating to the requested person, retrieving the stored reputation data within the specified context for each retrieved network relating to the requested person, retrieving the stored member data identifying members of networks relating to the requested party, and retrieving the stored reputation data within the specified context of each retrieved member for each retrieved member of each network relating to the requested party, aggregating the retrieved reputation data to create a response having aggregated party reputation data for the requested party within the specified context and sending, to the party aggregation query unit from the party reputation aggregation unit, the response having aggregated party reputation data for the requested party within the specified context.

The present invention may further provide party reputation aggregation unit in an LDAP data system for storing, retrieving and aggregating reputation data of a party within a context comprising an authorization management component for retrieving reputation data of a requested party within a specified context and aggregating the retrieved reputation data relating to the requested party within the specified context, the requested party having relationships and networks, the networks having members, a reputation management component for providing to the authorization management component reputation data relating to the requested party within the specified context, including reputation data of relationships relating to the requested party, networks relating to the requested party and members of related networks, a relationship management component for providing to the authorization management component relationship data identifying relationships relating to the requested party, and a social network management component for providing to the authorization management component network data identifying networks relating to the requested party.

The present invention may further provide a computer program product embodied in a computer readable medium for operating in a system comprising a network I/O, a CPU, one or more databases, a party aggregation query unit and a party reputation aggregation unit coupled to the party aggregation query unit and having stored reputation data of one or more parties therein, for implementing a method for retrieving and aggregating the stored reputation data of a requested party within a specified context, the method comprising receiving a reputation aggregation request having a party parameter and a context parameter requesting a response having aggregated party reputation data for the requested party within the specified context, the party parameter specifying the requested party and the specified context specifying the context for which the aggregated party reputation data is requested, retrieving the stored reputation data related to the requested party within the specified context, determining if the requested party is a person and, if so, retrieving stored relationship data relating to the requested person, retrieving the stored reputation data within the specified context for each relationship relating to the requested person, retrieving the stored network data relating to the requested person, retrieving the stored reputation data within the specified context for each retrieved network relating to the requested person, retrieving the stored member data identifying members of networks relating to the requested party, and retrieving the stored reputation data within the specified context of each retrieved member for each retrieved member of each network relating to the requested party, and aggregating the retrieved reputation data to create a response having aggregated party reputation data for the requested party within the specified context.

The present invention may further provide a method for deploying for deploying a computer infrastructure in a system comprising a network I/O, a CPU, one or more databases, a party aggregation query unit and a party reputation aggregation unit coupled to the party aggregation query unit and having stored reputation data of one or more parties therein, for implementing a process for retrieving and aggregating the stored reputation data of a requested party within a specified context, the process comprising collecting stored reputation data relating to the requested party in the specified context, weighing the collected reputation data relating to the requested party based upon the specified context, aggregating the weighed reputation data relating to the requested party, collecting stored relationship data identifying relationships relating to the requested party, collecting stored reputation data within the specified context relating to the identified relationships for each identified relationship, weighing the collected reputation data relating to the identified relationships based upon the specified context, and aggregating the weighed, collected reputation data relating to the identified relationships.

BRIEF DESCRIPTION OF THE DRAWINGS

These and other features of this invention will be more readily understood from the following detailed description of the various aspects of the invention taken in conjunction with the accompanying drawings in which:

FIG. 4a illustrates an embodiment of a method of the present invention in a party reputation aggregation unit of the present invention for determining, collecting and aggregating reputation information of a party from various sources when the party is an organization or a network.

FIG. 4b illustrates an embodiment of a method of the present invention in a party reputation aggregation unit of the present invention for determining, collecting and aggregating reputation information of a party from various sources when the party is a person.

The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

The present invention, which meets the needs identified above, provides a method and system for determining and collecting the reputation of a party from various sources and maintaining history. The method and system of the present invention further provides for the aggregation of such data and presenting this data to a qualified requestor.

Many different data systems store, organize and provide access to data, such as those using the LDAP protocol. Lightweight Directory Access Protocol, or LDAP, is an application protocol for querying and modifying data using directory services running over TCP/IP. A directory service is simply the software system that stores, organizes and provides access to information in a directory. A directory is a set of objects with attributes organized in a logical and hierarchical manner. As an example, Microsoft Active Directory® software and technology is a technology created by Microsoft that provides a variety of network services, including LDAP-like directory services. There are other directory services software products and other protocols and these are noted as examples.

Figure 1:
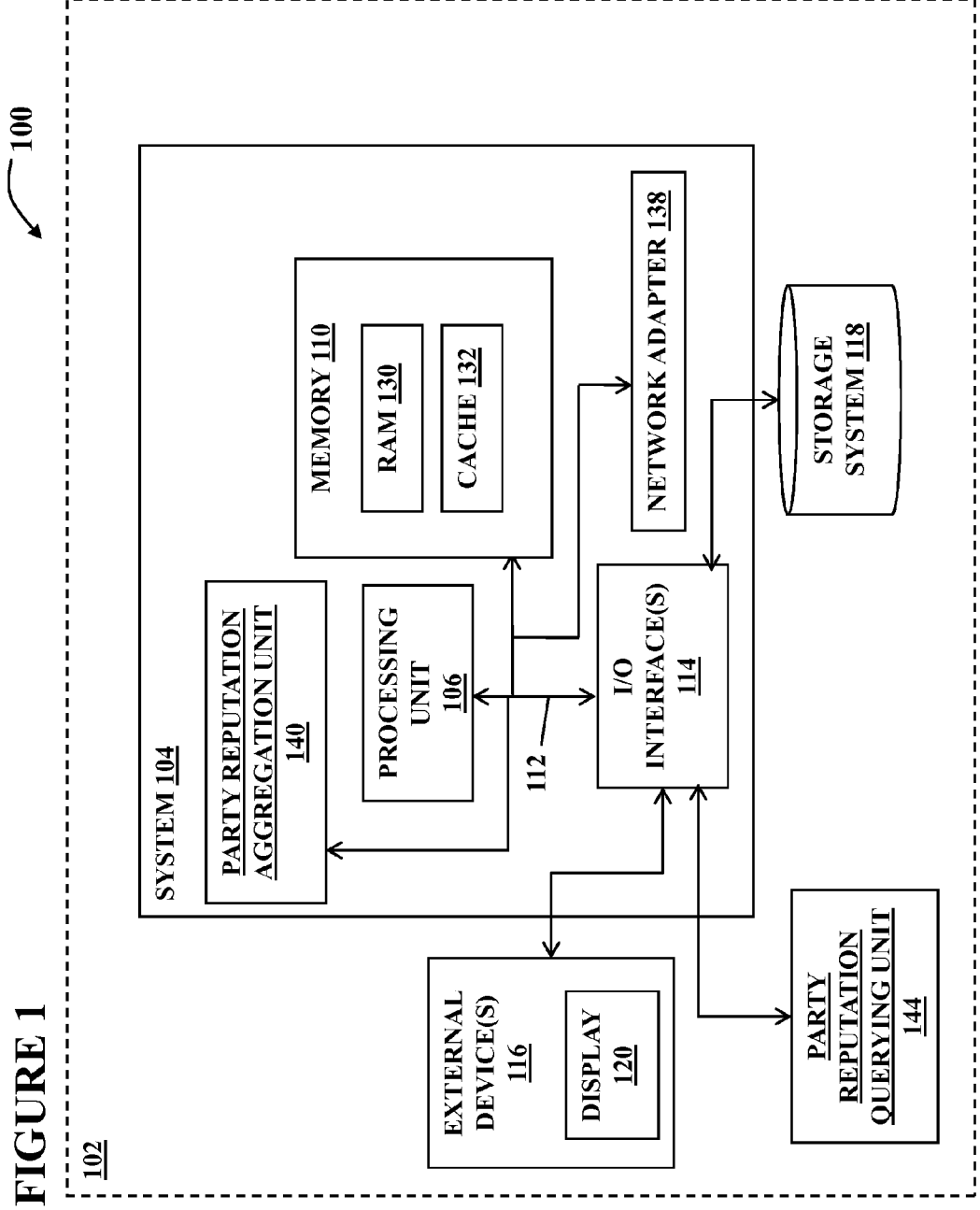
FIG. 1 shows a data processing system suitable for implementing an embodiment of a system for determining, collecting and aggregating reputation information of a party from various sources of the present invention.

A data processing system 100, such as data processing system 102 shown in FIG. 1, suitable for storing and/or executing program code of the present invention may include party reputation aggregation system 104 having at least one processor (processing unit 106) coupled directly or indirectly to memory 110 through system bus 112. Memory 110 can include local memory (RAM 130) employed during actual execution of the program code and cache memories (cache 132) that provide temporary storage of at least some program code in order to reduce the number of times code must be retrieved from bulk storage 118, connected to party reputation aggregation system 104, during execution. Input/output or I/O devices (external peripherals 116) (including but not limited to keyboards, displays (display 120), pointing devices, etc.) can be coupled to party reputation aggregation system 104 either directly or indirectly through a network (see FIG. 2) through intervening I/O controllers (I/O interface(s) 114). Party reputation aggregation system 104 may also include party reputation aggregation unit 140 coupled to system bus 112. Data processing system 102 may further have party reputation querying unit 144 coupled to party reputation aggregation unit 140 either directly or indirectly through a network (see FIG. 2) through intervening I/O controllers (I/O interface(s) 114 for sending party reputation aggregation requests, or queries, to party reputation aggregation unit 140 and receiving party reputation aggregation responses from party reputation aggregation unit 140. Requests or queries sent by party reputation aggregation querying unit 144 may be manually created by, such as, keying in a query on a keyboard (external peripheral(s) 114) and transmitting to party reputation aggregation system 104 or, alternatively, may be automatically generated by a separate computer, e.g., and transmitting to party reputation aggregation system 104.

Figure 2:
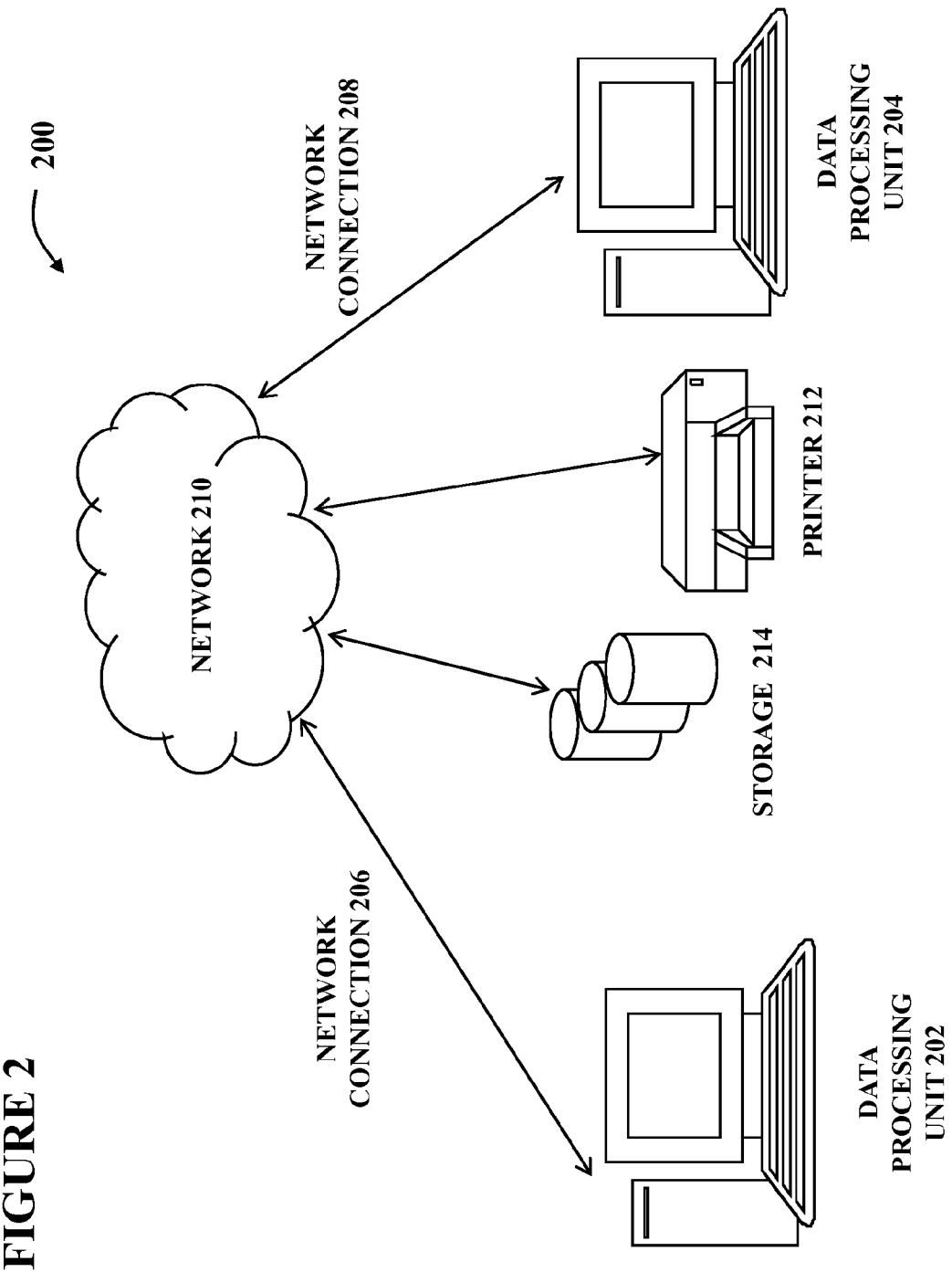
FIG. 2 shows a network that may incorporate an embodiment of the present invention.

Network adapters (network adapter 138 in FIG. 1) may also be utilized in system 200 to enable data processing units (as shown in FIG. 2, data processing unit 202) to become coupled through network connections (network connections 206, 208) to other data processing units (data processing unit 204), remote printers (printer 212) and/or storage devices (storage 214) or other devices through intervening private and/or public networks (network 210).

Figure 3:
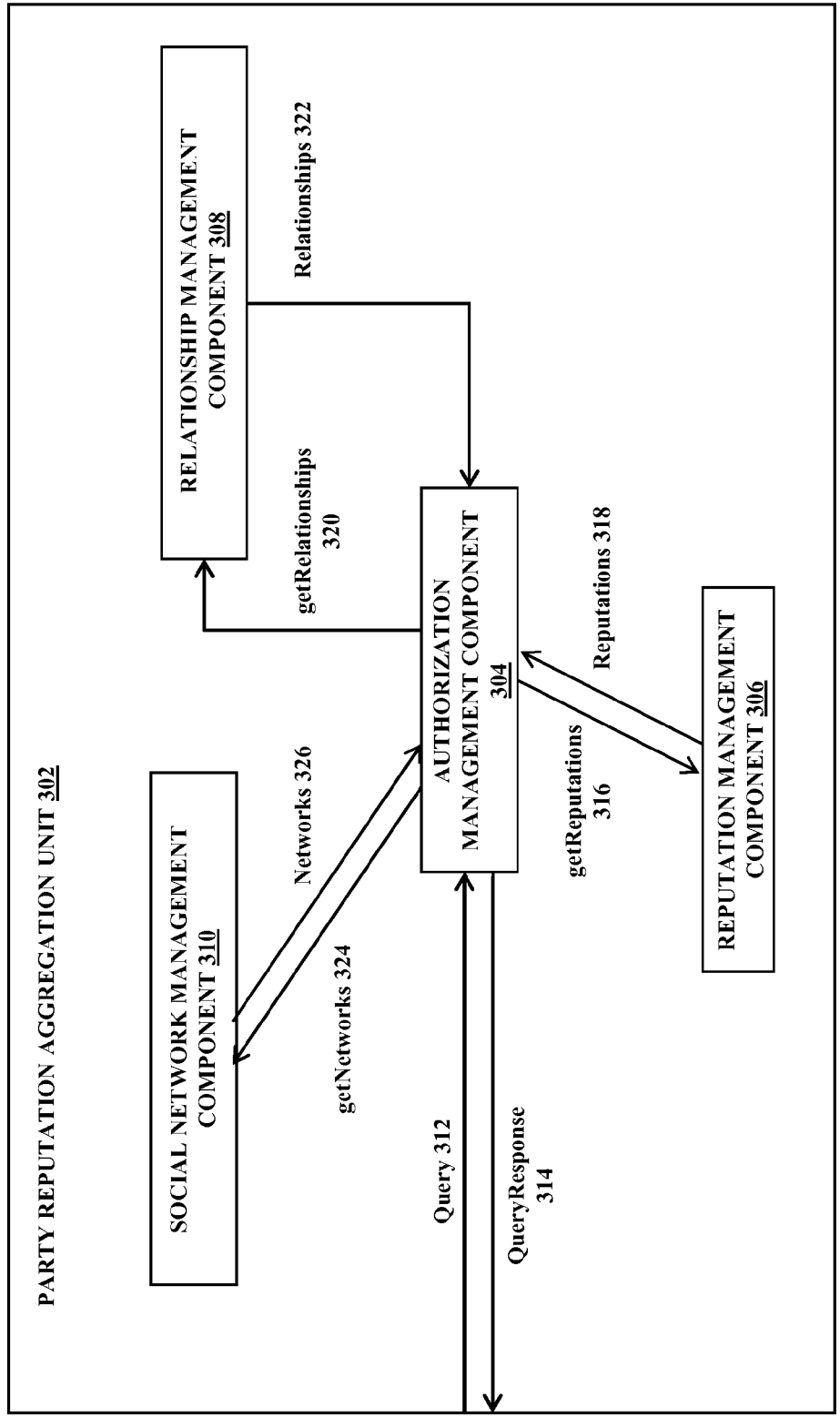
FIG. 3 illustrates one embodiment of a party reputation aggregation unit of the present invention for determining, collecting and aggregating reputation information of a party from various sources.

As shown in FIG. 3, system 300 provides a party reputation aggregation unit 302 of interrelated components (i.e., authorization management component 304, reputation management component 306, relationship management system 308 and social network management component 310). Reputation management component 306, relationship management system 308 and social network management component 310 are connected to authorization management component 304 for receiving requests for related information and passing that information back to authorization management component 304. Authorization management component 304 receives a query for information related to a party (a "party" may be an individual or an organization such as a social network), collects the queried information and responds with the queried-for information. For instance, when authorization management component 304 receives a query 312, it, in turn, queries reputation management component 306 via a getReputations request 316, reputation management component 306 may then collect the requested reputation information relating to the party (individual/organization), make final computations, such as weighing and aggregating (such as in a running average manner), to the collected information and pass the weighed and aggregated reputation relating to the party back to authorization management component 304 via a getResponse (Reputations) response 318. Authorization management component 304 may, in turn, make further final computations, such as weighing and aggregating, depending upon a calculation strategy stored in authorization management component 304 (to be discussed further), and may then query relationship management system 308 via a getRelationships request 320, relationships management component 308 may then collect the requested relationships information relating to the party (individual/organization), aggregate the collected information, make final computations as to the collected information (e.g., determining which relationships are more important than others based upon the request context) and pass the relationship information back to authorization management component 304 via a getResponse (Relationships) 322. Social network management component 310 may then be queried by authorization management component 304 via a getNetworks query 324 for social relationships information relating to the party (individual/organization) in which case social network management component 310 may then collect the requested social relationships information relating to the party, make final computations as to the collected information (e.g., determining which networks are more important than others based upon the request context) and pass (individual/organization) the requested social relationships information relating to the party to authorization management component 304 via a getResponse (Networks) response 326. "Social networks" may be used interchangeably with "networks", "social relationships" and "organizations". Authorization management component 304, which has coordinated these activities, may then request further reputations, relationships or social networks, aggregate the information collected from the responses, compute a final reputation value and provide a response to the initial query 312 via queryResponse 314.

FIG. 4a and FIG. 4b respectively illustrate an organization reputation aggregation message flow 400a and an individual reputation aggregation message flow 400b occurring within party reputation aggregation unit 140. Organization reputation aggregation message flow 400a illustrates the message flow between authorization management component 402, reputation management component 404, relationship management system 406 and social network management component 408 when an aggregate reputation request 410 is received for an organization. Individual reputation aggregation message flow 400b illustrates the message flow between authorization management component 402, reputation management component 404, relationship management system 406 and social network management component 408 when an aggregate reputation request 410 is received by authorization management component 402 with respect to an individual (or person).

Beginning with FIG. 4b in individual reputation aggregation message flow 400b, aggregate reputation request 410 is received by authorization management component 402 with respect to an individual (or person). Aggregate reputation request 410 includes at least two parameters: Person (specifying the individual or person for whom aggregate reputation request 410 identifies) and Context (specifying the context for which aggregate reputation request 410 requests. Examples of the Context parameter may be skill level, e.g., Person's skill level, such as in the use of power equipment or in programming in Java® programming language, etc., or Person's trustworthiness level or need-to-know status such as for security purposes. Java® is a registered trademark of Sun Microsystems, Inc., a wholly owned subsidiary of Oracle Corporation.) Authorization management component 402 issues getReputation (Person, Context) request 412 to reputation management component 404. Reputation management component 404 parses getReputations (Person, Context) request 412, collects reputation data related to the requested Person within the specified Context from various sources within reputation management component 404 (to be discussed further herein below), aggregates reputation data, applies appropriate weighting and averaging and provides Reputations (Person, Context) response 414 to authorization management component 402. Authorization management component 402 then issues getRelationships (Person, Context) request 416 to relationship management component 406 for retrieving relationships related to Person in Context. Relationship management component 406 parses getRelationship (Person, Context) request 416, collects relationship data related to Person in Context from various sources within relationship management component 406, and provides Relationship (Person, Context) response 418 to authorization management component 402. Authorization management component 402 then issues getReputations (Person, Reputation) request 422 and receives Reputation (Person, Reputation) response 424 from within reputation management component 404 for each relationship of Person identified by relationship management component 406, iterating within total relationships loop 420, that is, if $Person_{relationship(1)}$, $Person_{relationship(2)}$, and $Person_{relationship(3)}$ are identified as relationships of Person, authorization management component 402 issues a getReputation ($Person_{relationship(1)}$, Context) request 422 to reputation management component 404. Reputation management component 404 parses getReputations ($Person_{relationship(1)}$, Context) request 412, collects the reputation data related to $Person_{relationship(1)}$ within Context from various sources within reputation management component 404, applies appropriate weighting and averaging and provides Reputations ($Person_{relationship(1)}$, Context) response 424 to authorization management component 402 and so forth for $Person_{relationship(2)}$ and $Person_{relationship(3)}$. This loop would continue until all reputation data is collected for $Person_{relationship(n)}$ where "n" is the number of relationships returned by relationship management component 406 for Person. Once the reputations are collected, Authorization management component 402 then issues getNetworks (Person, Context) request 426 to social network management component 408 for obtaining social network information relating to Person in Context. Social network management component 408 parses getNetworks (Person, Context) request 426, collects social networks data related to Person from various sources within social network management component 408, and provides Networks (Person) response 428 having social network information to authorization management component 402.

In total networks loop 428, authorization management component 402 issues AggregateReputation($Networks_{(x)}$, Context) request 430 and the message flow moves to "A" of FIG. 4a, which illustrates a social network reputation aggregation message flow 400a having authorization management component 402, reputation management component 404, relationship management system 406 and social network management component 408 when aggregate reputation request 430 is received for an organization, such as from itself (that is, authorization management component may make a call to itself as is shown from aggregate reputation request 430 "A" shown in FIG. 4b). Authorization management component 402 receives AggregateReption($Networks_x$, Context) wherein the "Networks" parameter identifies the network or organization for which the reputation is requested and the "Context" parameter identifies the parameter for which the reputation is requested. Authorization management component 402 issues getNetworkReputation($Networks_x$, Context) request 434 to reputation management component 404 which responds with NetworkReputation($Network_x$, Context) response 436 which represents the reputation information of the requested network. Authorization management component 402 then issues getMembers($Networks_{(x)}$) request 438 to social network management component 408 which responds with Members($Networks_{(x)}$, Context) response 439 providing the members in context of the requested network. Within total members loop 441, authorization management component 402 issues getReputation ($Members_{(z)}$, Context) request 442 to reputation management component 404 which responds with Reputation ($Members_{(z)}$, Context) response 444 providing the reputations of the requested Members 1 through z, iterating within total members loop 441. Once aggregated and properly weighted, authorization management component 402 issues ReputationAggregation ($Networks_{(x)}$, Context) request 432 to "B" in FIG. 4b to total networks loop 429 wherein the next network is looped back to "A" in FIG. 4a, iterating through the same process as described above is performed for all networks 1 through x. Ultimately, authorization management component 402 issues a ReputationAggregation(Person, Context) response 440 (FIG. 4b) corresponding to the total aggregated reputation of Person (and corresponding relationships and networks) within Context. This corresponds to QueryResponse 314 of FIG. 3.

Figure 5:
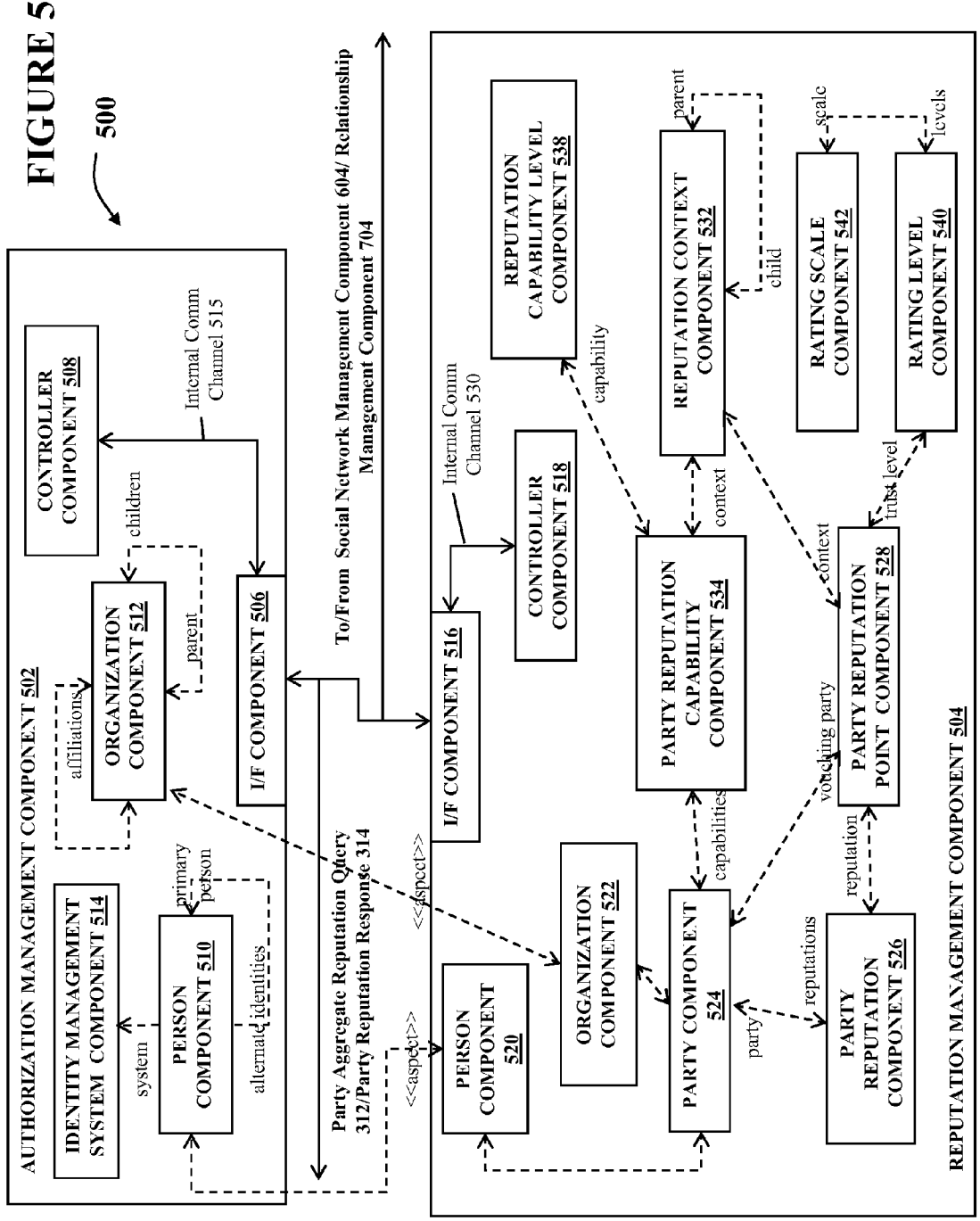
FIG. 5 illustrates one embodiment of a party reputation aggregation unit for determining, collecting and aggregating reputation information of a party from various sources of the present invention illustrating in greater detail of the authorization management component and the reputation management component.
Figure 6:
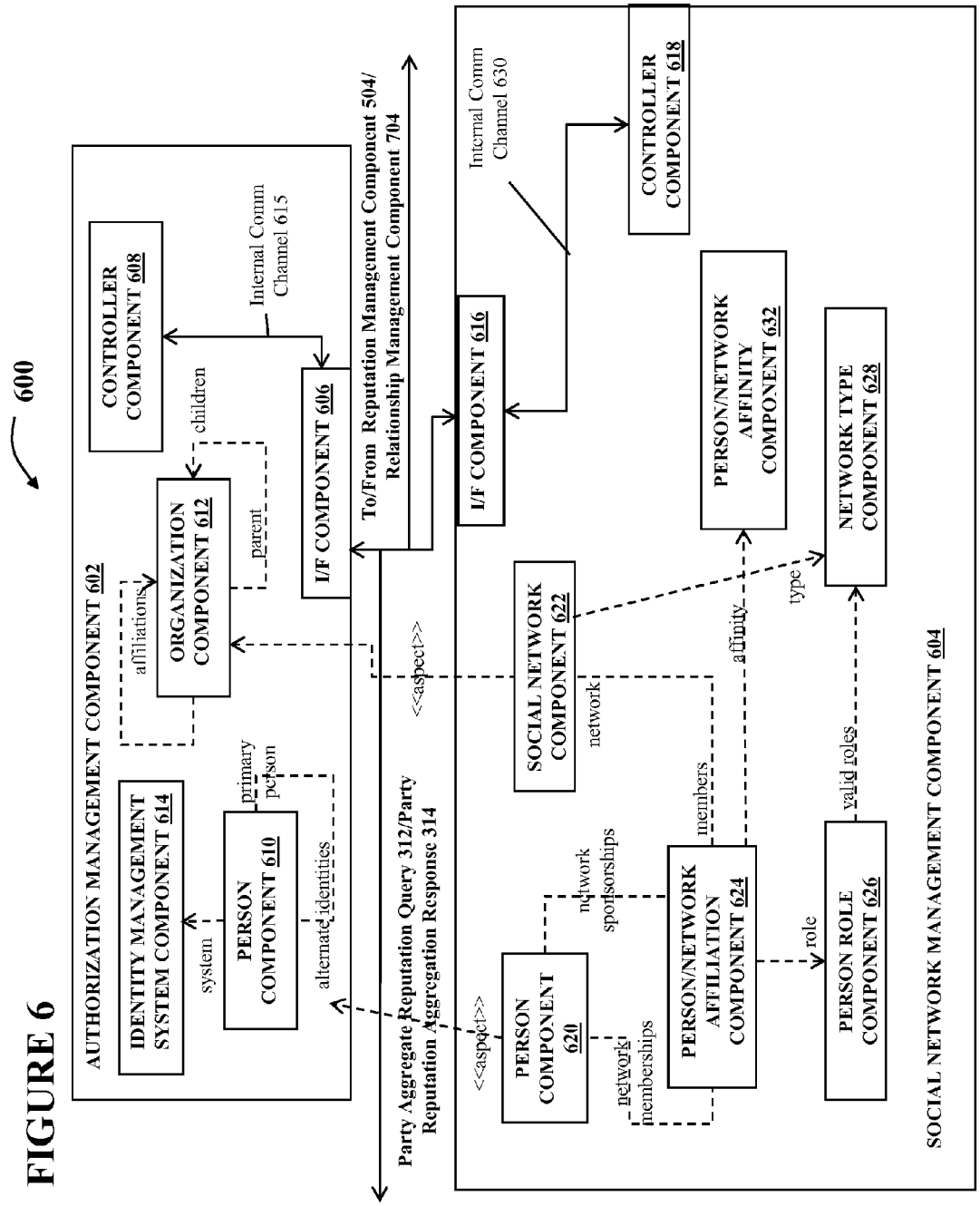
FIG. 6 illustrates one embodiment of a party reputation aggregation unit for determining, collecting and aggregating reputation information of a party from various sources of the present invention illustrating in greater detail of the authorization management component and the social network management component.
Figure 7:
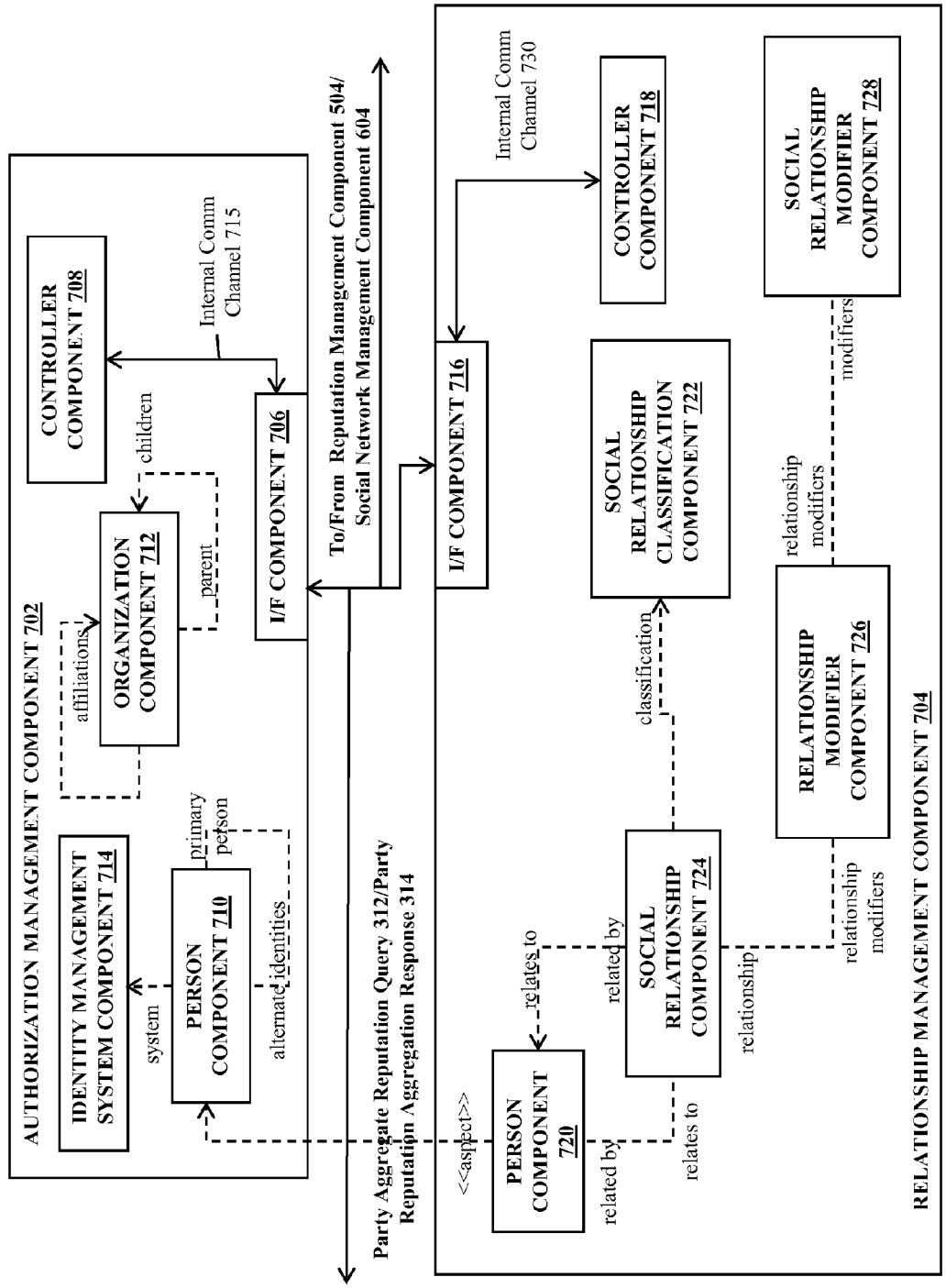
FIG. 7 illustrates one embodiment of a party reputation aggregation unit for determining, collecting and aggregating reputation information of a party from various sources of the present invention illustrating in greater detail of the authorization management component and the relationship management component.

FIG. 5 illustrates a subsystem 500 of party reputation aggregation unit 300 (FIG. 3) having authorization management component 502 and reputation management component 504 shown in greater detail. Authorization management component 502 has an interface component 506 for providing an interface for authorization management component 502 that interfaces with other components such as party reputation querying unit 144 (FIG. 1), reputation management component 504, relationship management component 704 (FIG. 7), and social network management component 604 (FIG. 6). Although components 502, 504, 604, 704 are identified in other figures (FIGS. 3, 4, 6 and 7), they are the same or substantially the same in form and function although the numbering is different due to their depiction in the various figures unless noted otherwise. That is, reputation management component 504 operates in the same or substantially the same as reputation management component 308, 404 and so forth. Within authorization management component 502, interface component 506 may be connected to controller component 508 via an internal communication channel 515. Controller component 508 communicates (communication channels not shown for clarity), with other components within authorization management component 502 such as organization component 512, person component 510 and identity management system component 514 and provides control between the various components within authorization management component 502. Each of these components 512, 514, 516 may have attributes, such as LDAP attributes for defining instances of objects of an object class held by the component. (An LDAP attribute is a characteristic of an object and the type of information an object can hold. For each object class, the schema defines what attributes an instance of the object class must have and what additional attributes it may have.) Controller component 508, together with interface component 506, organization component 512, person component 510 and identity management system component 514, operates to receive party reputation aggregation queries, each query having a party parameter and a context parameter, parses the query, and communicates other components within the party reputation aggregation unit 140, 302 (FIGS. 1, 3), such as reputation management component 504, social network management component 604 (FIG. 6) and relationship management component 704 (FIG. 7) to retrieve reputation data related to the person within the context identified in the query, to weigh and aggregate the retrieved reputation data and to send the aggregated reputation data to party reputation query unit 144 (FIG. 1). Person component 510 and identity management system component 514 work to identify the party if the party is a person and to manage retrieved aggregated person reputations. From a primary person instance, Person Component 510 identifies alternate identities, e.g., aliases, of the primary person. Identity management system component 514 identifies the particular identity management system used by the person. For instance, the identity management system used by the person may be the United States Social Security Administrative System or an alternative identity management system. Organization component 512 works to identify the party if the party is an organization or network and to manage retrieved network reputations. Once an organization is determined, organization component 512 further identifies affiliations of the organization, e.g., the organization NATO may be affiliated to the United States Department of Defense, etc., and identifies parents and children of the organization, e.g., a CEO "party" (Chief Executive Officer) may have Board of Directors "party" as a parent and have a COO (Chief Operating Officer) as a child. Controller component 508 operates to convey and receive messages, person reputation data, relationships reputation data, network reputation data and network members' reputation data to and from reputation management component 504, social network management component 604 (FIG. 6) and relationship management component 704 (FIG. 7). The message flow to/from authorization management component 502 is shown in and described above in relation to FIG. 4a and FIG. 4b. Controller component 508 further interoperates with person component 510, organization component 512 and identity management system component 514 to manage retrieved party reputation data and to weigh and aggregate them when all of the iterations are complete and all of the related reputation data have been retrieved. Finally, controller component 508 operates with interface component 506 to send QueryResponse 312 (FIG. 3), alternatively named ReputationAggregation(Person, Context) 440 (FIG. 4b) to party reputation querying unit 144 (FIG. 1).

FIG. 5 further describes reputation management component 504 that has an interface component 516 for providing an interface for reputation management component 504 with controller component 518 within reputation management component 504 via internal communication channel 530 and to authorization management component 502. Reputation management component 504 further has person component 520, organization component 522, party component 524, party reputation component 526, party reputation point component 528, rating level component 540, rating scale component 542, reputation context component 532, party reputation capability component 534 and reputation capability level component 538. Controller component 518 provides controller functionality to person component 520, organization component 522, party component 524, party reputation component 526, party reputation point component 528, rating level component 540, rating scale component 542, reputation context component 532, party reputation capability component 534, and reputation capability level component 538 within reputation management component 504. Many internal communications channels with reputation management component 504 are not shown for clarity. Controller component 518 operates with person component 520, organization component 522 and party component 524 to manage the reputation data and context with respect to parties, i.e., persons or organizations. Person component 520 may be a different aspect or instance of person component 510 while organization component 522 may be a different instance of organization component 512. Person component 520 and organization component 522 identify to party component 524 whether the party is a person, e.g., a teacher, a Congressman, etc., or an organization and kind of person or type of organization, e.g., corporation, partnership, etc., respectively. Controller component 518 further operates with party reputation capability component 534, reputation capability level component 538, and reputation context component 532 to store, manage, collect, weigh and aggregate collected reputation data of a party within a context. For instance, party reputation capability component 534 identifies the capability of a party providing reputation data to confer that reputation data, e.g., The Open Group® may have the capability to confer Master IT Architect certification status, while reputation capability level component 538 provides the capability level that a party may confer reputation values and the reputation context component 532 provides the reputation based upon a given context. The Open Group® is a registered trademark of Open Group, L.L.C.

Party reputation component 526, party reputation point component 528, and rating level component 530 are utilized to expedite processing as party reputation point component 528 provides party reputation points, rating level component 530 provides a rating level, while party reputation component 526 collects, weighs, and aggregates reputation data based upon all of the factors discussed for those reputations most frequently requested, last requested, etc. Party reputation component 526 effectively stores pre-fetched, pre-calculated reputations based upon predications for next most likely requests for expeditious reputation retrieval.

Together, the components of reputation management component 504 operate to receive requests/queries for reputation data of a party (person or organization) within a context. Each request is parsed to identify the party and context, retrieve reputation data within the context, weigh reputation data, aggregate all of the retrieved, weighed reputation data and convey the retrieved, weighed, aggregated reputation data to authorization management component 502.

FIG. 7 illustrates a subsystem 700 of party reputation aggregation unit 300 (as described with relation to FIG. 3) having authorization management component 702 and relationship management component 704 in greater detail. Authorization management component 702 has components such as interface component 706 connected to controller component 708 via internal communication channel 718, organization component 712, person component 710 and identity management system component 714, each of which have the same or substantially the same function/responsibilities as those described with components 506, 508, 510 and 512 as shown and described above with relation to FIG. 5.

FIG. 7 further describes relationship management component 704 that has an interface component 716 for providing an interface for relationship management component 704. Interface component 716 interfaces with authorization management component 702 and, by internal communication channel 730, with controller component 718 within relationship management component 704. Relationship management component 704 further has person component 720, social relationship classification component 722, social relationship component 724, relationship modifier component 726 and social relationship modifier component 728. Each of these components is interconnected by internal communication channels (not shown for clarity). Controller component 718 provides controller functionality to person component 720, social relationship component 724, social relationship classification component 722, relationship modifier component 726, and social relationship modifier component 728 within relationship management component 704. Controller component 718 operates with person component 720 and social relationship component 724 to manage relationship data with respect to persons. For example, person component 720 and social relationship component 724 share information relating to relationships, e.g., a person may be identified as a parent, a supervisor, a colleague, etc., that may be related to a child, employee, colleague, etc. Controller component 718 further operates with social relationship classification component 722 to store relationship classifications, such as parent/child, supervisor/employee, etc., and to classify any social relationships that the person has. Relationship modifier component 726 operates to modify stored relationships while social relationship modifier component 728 operates to modify stored social relationships allowing the relationships to be modified.

Together, interface component 716, person component 720, social relationship component 724, social relationship classification component 722 under control of controller component 718 operate to receive requests/queries for relationships data of a party (person), i.e., an identification of persons that the person has relationships with, the type of the relationship that the person has with the relationship, and to provide this relationship data, via interface component 716, to authorization management component 702. Authorization management component 702 may then request the reputation data from reputation management component 504 (FIG. 5) for each of the identified person's relationships as discussed and shown in relation to FIG. 5.

FIG. 6 illustrates a subsystem 600 of party reputation aggregation unit 300 (as described with relation to FIG. 3) having authorization management component 602 and social network management component 604 in greater detail. Authorization management component 602 has components such as interface component 606 connected to controller component 608 via internal communication channel 615, organization component 612, person component 610 and identity management system component 614, which are interconnected by internal communication channels (not shown for clarity). Each of the components and internal communication channel 615 have the substantially same functions/responsibilities as those described with components 506, 508, 510 and 512 and internal communication channel 515 as shown in and described in relation to FIG. 5.

FIG. 6 further describes social network management component 604 that has an interface component 616 for providing an interface for social network management component 604 and is interconnected by internal communication channel 630 to controller component 618. Social network management component 604 further has person component 620, social network component 622, person/network affiliation component 624, person role component 626, network type component 628, and person/network affinity component 632. These components are interconnected by internal communication channels (not shown for clarity). Controller component 618 provides controller functionality to person component 620, social network component 622, person/network component 624, person/network affiliation component 624, person role component 626, network type component 628, and person affinity component 632 within social network management component 604. Controller component 618 operates with person component 620 and social network component 622 to manage data with respect to parties, i.e., persons or organizations. Person component 620 and social network component 622 share such information as to which networks a person is a member of and as to the sponsors, if any, of the person in a network, such as, e.g., a sponsor to a person to join a yacht club. Controller component 518 further operates with person/network affiliation component 624 to identify any networks that the person is affiliated with. Person affinity component 632 operates to identify the affinity the person has with each of the identified networks, that is, e.g., how closely the person is tied to the organization may be determined by how often the person utilizes the identified network, whether and how often the person attends meeting, etc. Person role component 626 operates to identify the role of the person in the network for each of the identified networks (e.g., president, vice-president, secretary, etc.) and network type component 628 operates to identify the type of the network for each of the identified networks (e.g., club, battleship, government agency, etc.).

Together, interface component 616, controller component 618, person component 620, social network component 622, person/network affiliation component 624, person role component 626, network type component 628, and person/network affinity component 632 under control of controller component 518 operate to receive requests/queries for social network data of a party (person), i.e., an identification of the networks that the person is affiliated with, an identification of the affinity that the person has with each network and an identification of the role in each of the networks affiliated with the person. Each request is parsed to identify the party, retrieve social network data that the person is affiliated with, identify the role of the person in each of the affiliated networks, identify the type of each of the affiliated networks and identify the affinity that the person has with each of the affiliated networks. The network data that is associated with the person, including the person/network affinity value and the network role of each affiliated network is conveyed by interface component 616 to authorization management component 602. Authorization management component 602 utilizes this information to request the reputation management component 604 to obtain the reputation of the affiliated networks.

Figure 8:
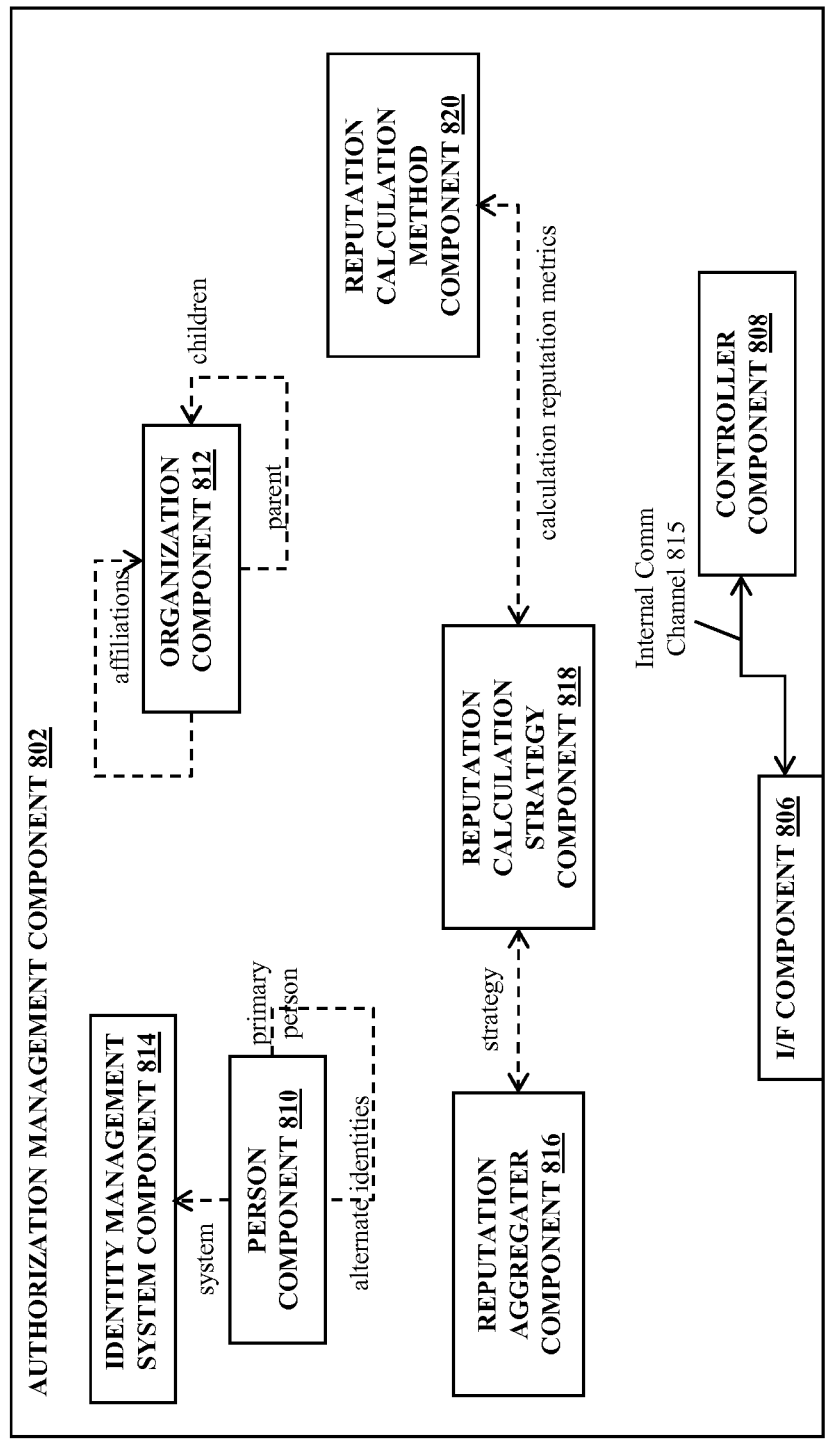
FIG. 8 illustrates an embodiment of an authorization management component of the present invention.

FIG. 8 illustrates another embodiment 800 of authorization management component 802 having components such as interface component 806 connected to controller component 808 via internal communication channel 815, organization component 812, person component 810 and identity management system component 814, which are interconnected by internal communication channel (not shown for clarity). Each of the components and internal communication channel 815 have the substantially same functions/responsibilities as those described with components 506, 508, 510 and 512 and communication channel 515 as shown in and described in relation to FIG. 5.

Further, authorization management component 802 has reputation aggregater component 816 for aggregating reputation information in accordance with a reputation aggregation strategy held by reputation calculation strategy component 818. Reputation aggregation and calculating methods, such as using a running weighted average as an example, are stored in reputation calculation method component 820.

Figure 9:
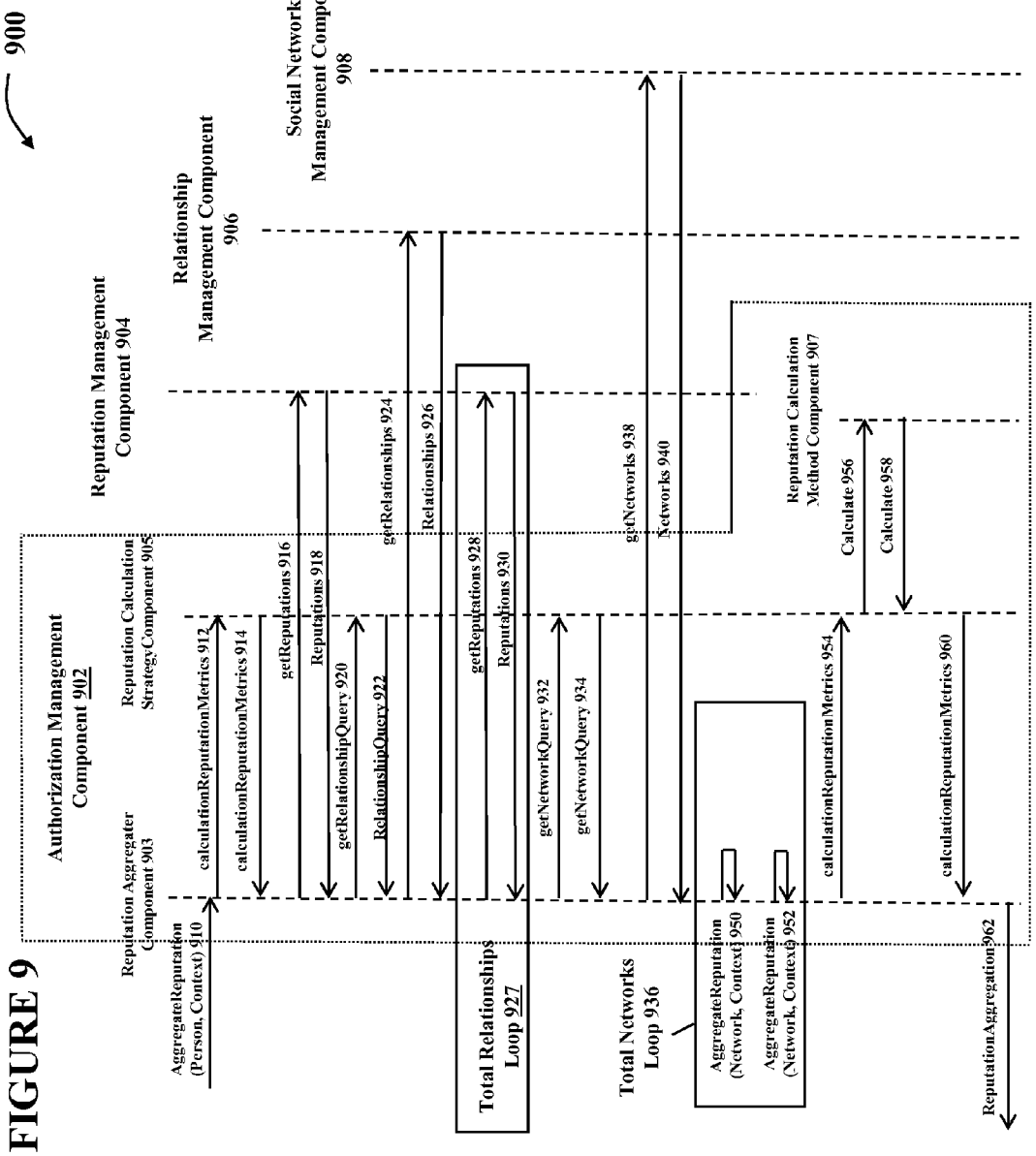
FIG. 9 illustrates an embodiment of a method of the present invention in an authorization management component of the present invention.

FIG. 9 illustrates another embodiment of a method of the present invention 900 showing reputation aggregation message flow within party reputation aggregation system 104 (FIG. 1) when authorization management component 802 (FIG. 8) is used. Aggregate reputation request 910 is received by reputation aggregater component 903 within authorization management component 402. Aggregate reputation request 910 comprises, as in aggregate reputation request 410 (FIG. 4b), at least two parameters: Person (specifying the individual or person for whom aggregate reputation request 910 identifies) and Context (specifying the context for which aggregate reputation request 910 requests). Reputation aggregater component 903 parses aggregate reputation request 910 and requests and receives, via calculationReputationMetrics 912, 914, the reputation collection, calculation and aggregation metrics, e.g., which reputation information to collect, how to weigh the collected reputation information and how to aggregate, from reputation calculation strategy component 905 within authorization management component 902. Reputation aggregater component 903 issues getReputation (Person, Context (not shown for clarity)) request 916 to reputation management component 904. Reputation management component 904 operates as discussed above and parses getReputations request 916, collects reputation data related to Person within Context from various sources within reputation management component 904 (as discussed above), aggregates reputation data, applies appropriate weighting and averaging and provides Reputations (Person, Context) response 918 to Reputation aggregater component 903. Reputation aggregater component 903 then requests and receives via getRelationshipsQuery 920, 922, the reputation relationship collection, calculation and aggregation metrics, e.g., which reputation relationship information to collect, how to weigh the collected reputation relationship information and how to aggegrate, from reputation calculation strategy component 905 within authorization management component 902. Reputation aggregater component 903 then requests and receives via getRelationships 924, 926 the relationships data related to Person from various sources within relationship management component 906. Reputation aggregater component 903 then requests and receives via getReputation 928, 930 the reputations of the identified relationships within total relationships loop 927, iterating for all of the relationships identified. Once the reputations are collected, reputation aggregater component 903 then requests and receives, via getNetworks 938, 940, to and from social network management component 908 for obtaining social network information relating to Person in Context.

In total networks loop 936, reputation aggregater component 903 then issues requests to itself via AggegrateReputation(Networks$_{(x)}$, Context) 950, 952, iterating until all of the networks are completed. Once all of the reputation data is collected, reputation aggregater component 903 then issues request calculationReputationMetrics 954 to reputation calculation strategy component 905, which, in turn, sends/receives calculate 956, 958 to/from reputation calculation method component 907, for receiving the reputation calculation method. Reputation calculation strategy component 905, in turn, forwards the reputation calculation method via calculationReputationMetrics 960. Reputation aggregater component 903 utilizes this information to generate the aggregated, weighed reputation information and generates ReputationAggregation 962.

It should be understood that the present invention is typically computer-implemented via hardware and/or software. As such, client systems and/or servers will include computerized components as known in the art. Such components typically include (among others) a processing unit, a memory, a bus, input/output (I/O) interfaces, external devices, etc.

While shown and described herein as a system and method for determining, collecting and aggregating the reputation of a party from various sources, it is understood that the invention further provides various alternative embodiments. For example, in one embodiment, the invention provides a computer-readable/useable medium that includes computer program code to enable a system for determining, collecting and aggregating the reputation of a party from various sources. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for determining, collecting and aggregating the reputation of a party from various sources. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and may mean any expression, in any language, code or notation, of a set of instructions intended to cause a computing device having an information processing capability to perform a particular function either directly before or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

In another embodiment, the invention provides a business method that performs the process steps of the invention on a subscription, advertising, and/or fee basis. That is, a service provider, such as a solution integrator, could offer to deploy a computer infrastructure for determining, collecting and aggregating the reputation of a party from various sources. In this case, the service provider can create, maintain, and support, etc., the computer infrastructure by integrating computer-readable code into a computing system, wherein the code in combination with the computing system is capable of performing the process steps of the invention for one or more customers. In return, the service provider can receive payment from the customer(s) under a subscription and/or fee agreement and/or the service provider can receive payment from the sale of advertising content to one or more third parties.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method in a data processing system having a network I/O, a CPU, and one or more databases, a party aggregation query unit and a party reputation aggregation unit coupled to the party aggregation query unit, the data processing system further having stored reputation data of one or more parties therein, the method for retrieving and aggregating stored reputation data of a requested party within a specified context based upon a reputation aggregation request having a party parameter and a context parameter requesting a response having aggregated party reputation data for a requested party within a specified context, the party parameter specifying the requested party and the specified context specifying the specified context for which the aggregated party reputation data is requested, the method comprising:

retrieving the stored reputation data related to the requested party within the specified context;

determining if the requested party is a person and, if so, retrieving stored relationship data relating to the requested person, retrieving the stored reputation data within the specified context for each relationship relating to the requested person, retrieving the stored network data relating to the requested person, retrieving the stored reputation data within the specified context for each retrieved network relating to the requested person, retrieving the stored member data identifying members of networks relating to the requested party, and retrieving the stored reputation data within the specified context of each retrieved member for each retrieved member of each network relating to the requested party; and aggregating the retrieved reputation data to create a response having aggregated party reputation data for the requested party within the specified context.

2. The method as defined in claim 1 wherein the stored reputation data is in LDAP format, the method further comprising:

collecting stored reputation data relating to the requested party in the specified context;

weighing the collected reputation data relating to the requested party based upon the specified context.

3. The method as defined in claim 2 further comprising:

collecting stored relationship data identifying relationships relating to the requested party;

stored reputation data relating to the collected retrieved relationship data within the specified context for each relationship relating to the requested party;

collecting stored reputation data relating to the collected retrieved relationship data within the specified context for each relationship relating to the requested party;

weighing the collected reputation data relating to the identified relationships based upon the specified context; and aggregating the weighed reputation data relating to the identified relationships.

4. The method as defined in claim 3 further comprising:

collecting stored network data relating to the requested party identifying networks within the specified context relating to the requested party;

collecting, by the reputation management component, stored reputation data relating to the received collected network data within the specified context for each identified network;

weighing the collected reputation data for each identified network based upon the specified context; and aggregating the weighed reputation data relating to the identified networks.

5. The method as defined in claim 4 further comprising:

collecting, by the network management component, stored network member data identifying members of the identified network;

collecting, by the reputation management component, stored reputation data relating to the identified network members in the specified context for each identified network member;

weighing the collected reputation data relating to the identified network members based upon the specified context; and aggregating the weighed reputation data relating to the identified network members.

6. The method as defined in claim 5 further comprising:

weighing the retrieved aggregated reputation data relating to the requested party, the retrieved aggregated reputation data relating to the identified relationships, the retrieved aggregated reputation data relating to the identified networks, and the retrieved aggregated reputation data relating to the identified network members based upon the specified context; and aggregating the weighed retrieved aggregated reputation data relating to the requested party, the weighed retrieved aggregated reputation data relating to the identified relationships, the weighed retrieved aggregated reputation data relating to the identified networks, and the weighed retrieved aggregated reputation data relating to the identified network members to create a response having the aggregated party reputation data for a requested party within the specified context.

7. The method as defined in claim 6 further comprising retrieving a calculation strategy specifying a calculation method and weighing the retrieved aggregated reputation data relating to the requested party, the retrieved aggregated reputation data relating to the identified relationships, the retrieved aggregated reputation data relating to the identified networks, and the retrieved aggregated reputation data relating to the identified network members utilizing the calculation method.

8. The method as defined in claim 3 wherein, if the requested party is a network, the method further comprising:

collecting, by the reputation management component, stored reputation data relating to the requested network within the specified context;

weighing the collected reputation data relating to the requested network within the specified context based upon the context; and aggregating the weighed reputation data relating to the requested network.

9. The method as defined in claim 8 further comprising:

collecting stored network member data identifying members of the requested network;

collecting stored reputation data relating to the identified network members within the specified context;

weighing the collected reputation data relating to the identified network members based upon the specified context based upon the specified context; and aggregating the weighed reputation data relating to the identified network members.

10. The method as defined in claim 9 further comprising:

weighing the retrieved aggregated reputation data relating to the requested network and the retrieved aggregated reputation data relating to the identified network members based upon the specified context; and aggregating the weighed retrieved aggregated reputation data relating to the requested network and the weighed retrieved aggregated reputation data relating to the identified network members to create a response having the aggregated party reputation data for a requested party within the specified context.

11. A party reputation aggregation unit in an LDAP data system for storing, retrieving and aggregating reputation data of a party within a context comprising:
an authorization management component for retrieving reputation data of a requested party within a specified context and aggregating the retrieved reputation data relating to the requested party within the specified context, the requested party having relationships and networks, the networks having members;
a reputation management component for providing to the authorization management component reputation data relating to the requested party within the specified context, including reputation data of relationships relating to the requested party, networks relating to the requested party and members of related networks;
a relationship management component for providing to the authorization management component relationship data identifying relationships relating to the requested party; and
a social network management component for providing to the authorization management component network data identifying networks relating to the requested party.

12. The party reputation aggregation unit as defined in claim 11 further comprising, in the authorization management component, a person component for storing and aggregating retrieved reputation data relating to the requested party when the requested party is a person and an organization component for storing and aggregating retrieved reputation data relating to the requested party when the requested party is a network.

13. The party reputation aggregation unit as defined in claim 11 further comprising, in the authorization management component, an identity management system component for storing and managing identity data relating to the requested party.

14. The party reputation aggregation unit as defined in claim 11 further comprising, in the reputation management component, a party reputation component for storing the reputation data, weighing reputation data relating to the party based upon the specified context and aggregating the weighed reputation data, and a reputation capability level component and a rating level component for weighing the reputation data of the requested party based upon the specified context.

15. The party reputation aggregation unit as defined in claim 11 further comprising, in the relationship management component, a person component and a social relationship component for determining the relationships of the person, a social relationship classification component for determining the classification of each relationship of the person.

16. The party reputation aggregation unit as defined in claim 13 further comprising, in the relationship management component, a relationship modifier component for modifying the relationships of the person, a social relationship modifier component for modifying the social relationships of the person.

17. The party reputation aggregation unit as defined in claim 11 wherein the party is a person, the unit further comprising a person/network affiliation component for storing, identifying and providing affiliations between the person and networks based upon the network data, and a person/network affinity component for storing, identifying and providing affinities between the person and networks based upon the network data.

18. A computer program product embodied in a computer readable medium for operating in a system comprising a network I/O, a CPU, one or more databases, a party aggregation query unit and a party reputation aggregation unit coupled to the party aggregation query unit and having stored reputation data of one or more parties therein, for implementing a method for retrieving and aggregating the stored reputation data of a requested party within a specified context based upon a reputation aggregation request having a party parameter and a context parameter requesting a response having aggregated party reputation data for the requested party within the specified context, the party parameter specifying the requested party and the specified context specifying the context for which the aggregated party reputation data is requested, the method comprising:
retrieving stored reputation data related to the requested party within the specified context;
determining if the requested party is a person and, if so, retrieving stored relationship data relating to the requested person identifying relationships related to the person, retrieving stored reputation data within the specified context for each identified relationship relating to the requested person, retrieving stored network data identifying networks related to the person relating to the requested person, retrieving stored reputation data within the specified context for each identified network relating to the requested person, retrieving the stored member data identifying members of networks relating to the requested party, and retrieving the stored reputation data within the specified context of each identified member of each network relating to the requested person; and
aggregating the retrieved reputation data to create a response having aggregated party reputation data for the requested party within the specified context.

19. The computer program product as defined in claim 18 wherein the stored reputation data is in LDAP format and wherein the method further comprises:
collecting stored reputation data relating to the requested party in the specified context;
weighing the collected reputation data relating to the requested party based upon the specified context;
collecting stored relationship data identifying relationships relating to the requested party;
collecting stored reputation data within the specified context relating to the identified relationships for each identified relationship;
weighing the collected reputation data relating to the identified relationships based upon the specified context; and
aggregating the weighed reputation data relating to the identified relationships.

20. The computer program product as defined in claim 19 wherein the method further comprises:
collecting stored network data relating to the requested party identifying networks within the specified context relating to the requested party;
collecting stored reputation data within the specified context relating to the identified networks for each identified network;
weighing the collected reputation data for each identified network based upon the specified context; and
aggregating the weighed reputation data relating to the identified networks.

21. The computer program product as defined in claim 20 wherein the method further comprises:
- collecting stored network member data identifying members of the identified network;
- collecting stored reputation data relating to the identified network members in the specified context for each identified network member;
- weighing the collected reputation data relating to the identified network members based upon the specified context; and
- aggregating the weighed reputation data relating to the identified network members.

22. The computer program product as defined in claim 21 further comprising:
- weighing the retrieved aggregated reputation data relating to the requested party, the retrieved aggregated reputation data relating to the identified relationships, the retrieved aggregated reputation data relating to the identified networks, and the retrieved aggregated reputation data relating to the identified network members based upon the specified context; and
- aggregating the weighed retrieved aggregated reputation data relating to the requested party, the weighed retrieved aggregated reputation data relating to the identified relationships, the weighed retrieved aggregated reputation data relating to the identified networks, and the weighed retrieved aggregated reputation data relating to the identified network members to create a response having the aggregated party reputation data for a requested party within the specified context.

23. A method for deploying a computer infrastructure in a system comprising a network I/O, a CPU, one or more databases, a party aggregation query unit and a party reputation aggregation unit coupled to the party aggregation query unit and having stored reputation data of one or more parties therein, for implementing a process for retrieving and aggregating the stored reputation data of a requested party within a specified context, the process comprising:
- collecting stored reputation data relating to the requested party in the specified context;
- weighing the collected reputation data relating to the requested party based upon the specified context;
- aggregating the weighed reputation data relating to the requested party;
- collecting stored relationship data identifying relationships relating to the requested party;
- collecting stored reputation data within the specified context relating to the identified relationships for each identified relationship;
- weighing the collected reputation data relating to the identified relationships based upon the specified context; and
- aggregating the weighed, collected reputation data relating to the identified relationships.

24. The method for deploying a computer infrastructure as defined in claim 23 wherein the process further comprises:
- collecting stored network data relating to the requested party identifying networks within the specified context relating to the requested party;
- collecting stored reputation data relating to the identified networks within the specified context for each identified network;
- weighing the collected reputation data for each identified network based upon the specified context; and
- aggregating the weighed reputation data relating to the identified networks.

25. The method for deploying a computer infrastructure as defined in claim 24 wherein the process further comprises:
- collecting stored network member data identifying members of the identified network;
- collecting stored reputation data relating to the identified network members in the specified context for each identified network member;
- weighing the collected reputation data relating to the identified network members based upon the specified context; and
- aggregating the weighed reputation data relating to the identified network members.

* * * * *